United States Patent [19]

Thompson et al.

[11] Patent Number: 5,544,584
[45] Date of Patent: Aug. 13, 1996

[54] PROCESS FOR PRODUCING POLYMER-COVERED FLEXOGRAPHIC PRINTING SLEEVES

[75] Inventors: William L. Thompson, Vancouver, Wash.; Mark A. Borski, Gresham, Oreg.

[73] Assignee: Thompson Urethane Products, Vancouver, Wash.

[21] Appl. No.: 352,955

[22] Filed: Dec. 9, 1994

[51] Int. Cl.⁶ ........................................ B41N 1/12
[52] U.S. Cl. .................. 101/401.1; 101/375; 101/395; 101/401; 492/56; 29/895.32
[58] Field of Search ..................... 101/216, 217, 101/141, 142, 375, 376, 395, 401.1, 493, 401; 492/18, 48, 56; 29/895.23, 895.3, 895.32

[56] References Cited

U.S. PATENT DOCUMENTS

| | | | |
|---|---|---|---|
| 3,475,803 | 11/1969 | Hill | 492/56 |
| 3,673,025 | 6/1972 | Fukuyama et al. | 492/56 |
| 3,959,574 | 5/1976 | Seanor et al. | 492/56 |
| 3,978,254 | 8/1976 | Hoexter | 438/36 |
| 4,044,678 | 8/1977 | Rasmussen | 101/378 |
| 4,144,812 | 3/1979 | Julian | 101/382.1 |
| 4,144,813 | 3/1979 | Julian | 101/382.1 |
| 4,296,172 | 10/1981 | Hill | 101/375 |
| 4,496,434 | 1/1985 | Morssinkhof | 204/11 |
| 4,903,597 | 2/1990 | Hoage | 101/401.1 |
| 5,206,992 | 5/1993 | Carlson et al. | 101/376 |
| 5,316,798 | 5/1994 | Tittgemeyer | 492/48 |

*Primary Examiner*—Stephen Funk
*Attorney, Agent, or Firm*—Marger Johnson McCollom & Stolowitz, P.C.

[57] ABSTRACT

A process for producing a durable, readily-storable, cylindrically-shaped flexographic printing sleeve having inner and an outer cylindrically-shaped walls and a substantially constant cross-sectional inner and outer diameter is provided. The flexographic printing sleeve is readily axially mountable on and dismountable from a complementary cylindrically-shaped printing cylinder having an outer cylindrically shaped wall. The process comprises providing a sleeve body. A layer of a low temperature curable polymeric material is provided to the outer circumferential surface of the sleeve body. The low temperature curable polymeric material is then cured at a temperature not greater than about 150 degrees F. to form a hardened layer of the polymeric material having a substantially uniform degree of hardness without damaging or distorting the sleeve body. A portion of the hardened layer of the polymeric material is removed to produce a flexographic printing sleeve having a thickness of up to about 0.100" and an impression range comprising an engagement distance of at least about 0.375" without any substantial visible reduction in print performance. The print performance comprises a print dot distortion of not more than about 0.0005" in the machine direction and not more than about 0.0002" in the cross machine direction.

31 Claims, 2 Drawing Sheets

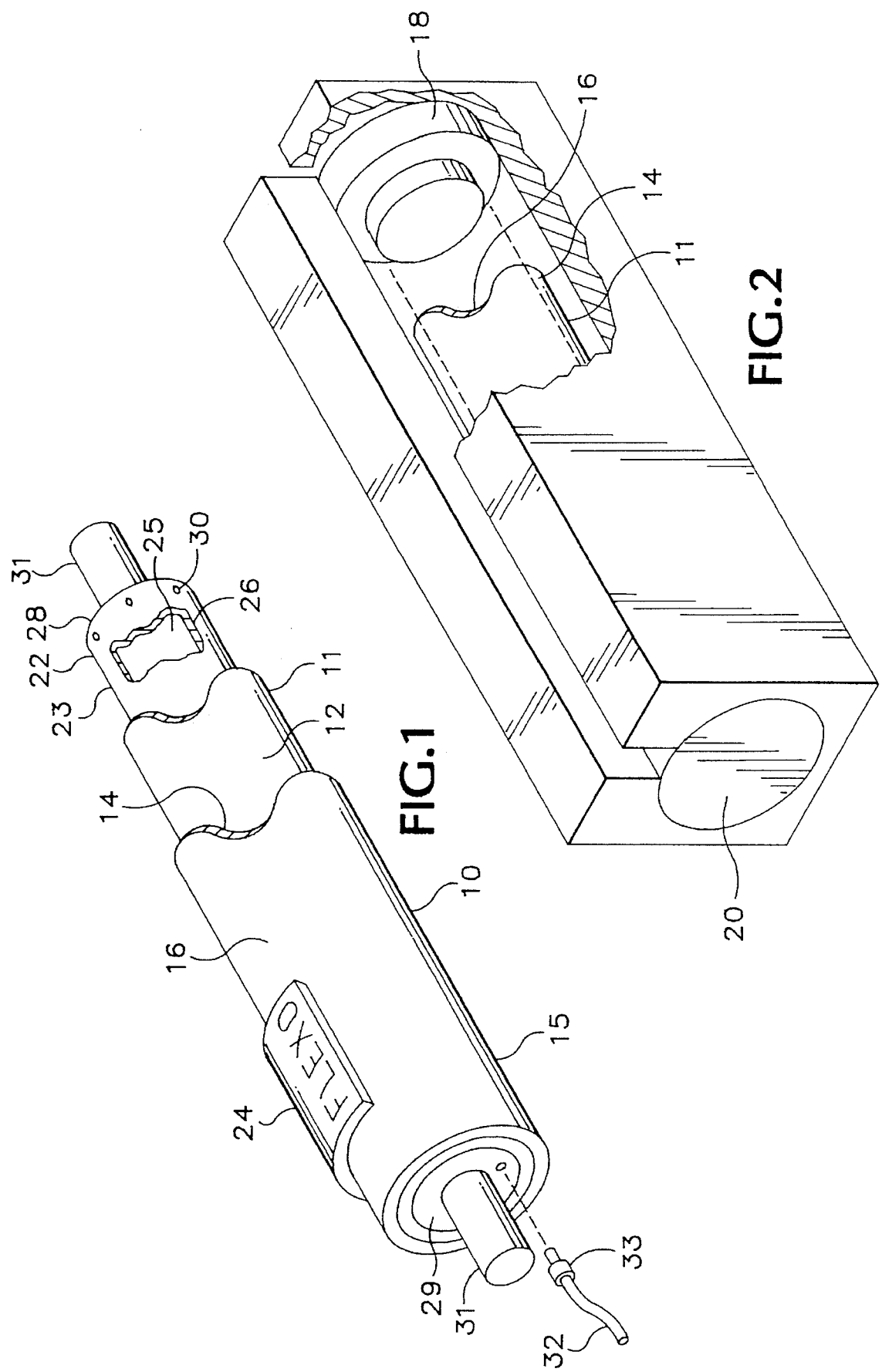

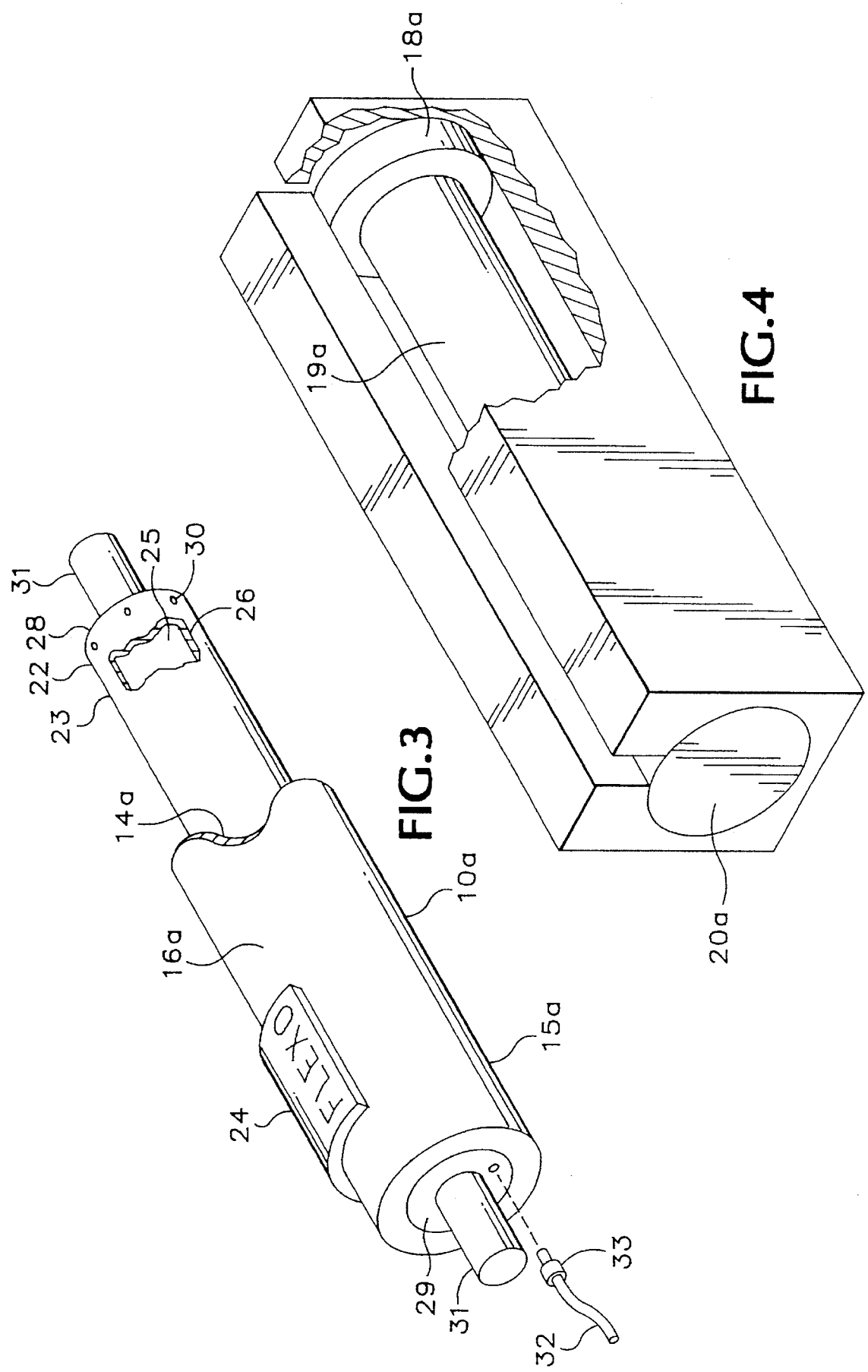

PROCESS FOR PRODUCING POLYMER-COVERED FLEXOGRAPHIC PRINTING SLEEVES

BACKGROUND OF THE INVENTION

Rubber-covered plate cylinders are used to a great extent in the printing industry, and particularly in the flexographic printing industry. Flexographic printing plates are mounted on the rubber-covered plate cylinders. The major reasons for using rubber covered cylinders is (a) to enlarge the cylinder to different repeat circumferences, and (b) to print a seamless pattern thereon (see subsequent discussion). In flexographic printing, for example, a different size (circumference) of plate cylinder, i.e., for each different repeat circumference, is needed for each print pitch (length of the final image). A separate cylinder is also needed for each color, up to as many as eight different colors. These plate cylinders can cost $1,000 each. Moreover, a typical printing plant may have as many as 1500 cylinders in inventory which causes a significant storage problem. The number of plate cylinders can be reduced through the use of cylindrical print sleeves (as hereinafter described) having the requisite printing plates directly attached thereto.

The use of thick rubber coverings which are typically more than 0.375" up to about 1.00" thick is known. These rubber coverings can be fabricated directly onto the plate cylinder themselves, or can be fabricated onto a print sleeve which in turn is applied to a plate cylinder by known air expansion techniques. In this latter case, the printing plates are attached to the outer surface of the rubber covering. However, these thick rubber covered prior art plate cylinders or print sleeves have a number of problems. First, they require high temperature vulcanizing processes to produce these thick rubber coverings. These vulcanization processes can damage or deform the underlying plate cylinder or print sleeve which will ultimately impair the accuracy of the flexographic printing process. These processing problems are discussed in more detail below. The vulcanization process described above also requires long cure times.

Next, because of the above-described high thickness level (and the resulting high outer diameter), the rubber covered plate cylinder assembly cannot readily utilize standard plate cylinder sizes with standard print repeats and gear sizes. This will not only result in extraordinary additional direct costs in initial replacement of standard equipment, but it will put the end user in a position whereby all of the major components of the non-conventional flexographic printing system must be replaced with non-standard equipment. The density of the rubber covering must be very high (at least about 75 pounds per square foot) resulting in a rubber covered printing cylinder system that is very difficult to handle.

As discussed above, a major problem that exists with respect to rubber-covered printing cylinders, and particularly flexographic printing cylinders, resides in the process for applying the covering to the printing cylinder outer surface. Typically, printing cylinders are prepared by applying an uncured elastomeric material such as synthetic and natural rubber onto the outer surface of a cylinder followed by curing the material by vulcanization in situ. This vulcanization process typically employs the application of a combination of pressure and heat to the uncured elastomeric material in an autoclave for a period of time. After curing is completed, the cylinder with its hardened covering can be machined to the required size and finish. High curing temperatures during the vulcanization (in some cases above 300 degrees F.) can damage the cylinder. Other cylinders, such as composite cylinders, may suffer some form of physical degradation from the heat imparted when the rubber is cured. If the cylinders are made of metal, they can warp or loose temper during processing. Some cylinders are, due to their materials of construction, incapable of being vulcanized. Rubber covered sleeves for these cylinders are designed to operate at high thickness levels, namely, at ⅜" to 1".

Typically, flexographic printing plates are made from a flat substrate which is distorted to form a rounded surface to be mounted on round plate cylinders. This means that a seam is present. Regardless of how tight the butt joint is put together a seam still exists. By using a rubber covering on a plate cylinder of a smaller size, the correct or required print pitch can be obtained. Then, by engraving the image on a rubber covering, problems associated with round seams are avoided.

For quality printing, such as with photopolymer printing plates, a sticky backed thin cellular foam cushion member, generally made from an open cell foam material, is used between the printing plate and the cylinder. Typically, the printing plates are about 0.045 to 0.105" thick, and the cushion member is about 0.015" to 0.040" thick. This foam-backing system is used by approximately 90% of all printers in the United States who use this cushioning material.

The introduction of this cushion member between the printing plates and the plate cylinder causes a variation in the thickness dimension at various points along the outer surface of the rubber covering. This results in high or low spots in the outer printing surface. This thickness variation is relatively large, typically at least about 0.002 to 0.005". The prior art rubber coverings also have a limited impression range. Impression range, as hereinafter more fully defined, is the engagement distance to which the surface of the print substrate can be depressed by the print indicia during the printing operation without causing substantial visible reduction in print performance. For conventional high performance printing, the impression range will not exceed about 0.008".

Other problems associated with thin foam plate cushions are as follows:

a. Thin foams are not resistant to common printing solvents such as ethanol, n-propanol, isopropanol, ethyl acetate and n-propyl acetate.

b. Thin foams are very labor intensive to mount and use.

c. Thin foams are very fragile to handle, they are easy to abuse and damage.

d. Thin foams have a limited useful life and cannot be remounted.

e. Thin foams deliver relatively poor performance on heavy solid printed areas.

f. Thin foams cannot be mounted without a seam.

Another issue is the fact that in conventional formation techniques for the above printing cylinders and sleeves, the exact hardness is difficult to obtain with long term repeatability. Therefore, such processes for producing rubber-covered cylinders or sleeves can be quite expensive. However, if a rubber-covered cylinder or sleeves can be reproducibly manufactured at a predetermined hardness level, the printing plates can be directly mounted onto the rubber covering without the need for cushioning. Cushioning is a problem because it cannot be assembled in a uniform thickness. Further, it adds significant expense to the cost of the cylinder or sleeves, and it can also degrade before the plates are worn out. Foam cushioning is not plate mounted or seamless. It is also a problem because the plate distorts. There are also problems with solvents and dimensional stability (which effects durability).

Dimensional stability is a requirement in rubber-covered flexographic printing operations since the outer surface of the rubber-covering must have a true cylindrical shape in order to perform the requisite printing functions, such as accurately imprinting an acceptable printing image onto a printing medium. This true cylindrical shape generally must be within a 0.0005"–0.002" tolerance level in order to be acceptable for flexographic printing applications.

From a commercial standpoint, if a cylinder is to be rubber-covered, it can be shipped both to and from a company who serves as the covering fabricator. Because of the weight and size of these cylinders, the cost of freight to and from the covering fabricator is quite high. Also, the time to complete the shipping and fabricating operation can be substantial and quite costly. The end user may have to undergo a loss of business because of the unavailability of a given rubber-covered cylinder at a time when a customer needs same for manufacturing purposes.

For the above reasons, and in order to reuse the plates, sleeves that fit over the plate cylinders can be used. These printing plate-printing sleeves assemblies can be mounted onto a plate cylinder using compressed air to expand the printing sleeve for conducting the mounting and dismounting operations. U.S. Pat. No. 4,903,597 (U.S. '597), for example, is directed to a composite laminate sleeve for the aforementioned purpose. U.S. '597, which is assigned to the assignee of this patent application, is incorporated herein by reference. However, the subject composite sleeve of U.S. '597 can only bridge two or three sizes of printing repeats. Furthermore, the U.S. '597 sleeve can become brittle when subjected to a vulcanizing process. Finally, since the U.S. '597 sleeve has a hard surface, a cushion is needed between the printing plate and the sleeve body.

The sleeve of U.S. Pat. No. 4,496,434 is fabricated of nickel. It can only be made in one thickness so it can't be used to increase repeat circumferences. Because of the 0.005" wall thickness, this sleeve bends easily and when it becomes bent it is no longer usable. Since the U.S. '434 sleeve is thin, it also can become damaged during the mounting operation. Since the U.S. '434 sleeve has a hard surface, it requires a cushion between the plate cylinder and the plate. Finally, the U.S. '434 sleeve exhibits a low level of durability.

U.S. Pat. No. 3,978,254 is directed to a carrier sleeve formed by three interlaminated layers, each layer formed of a helically-wound plastic tape. This sleeve comprises a single thickness, requires a cushion and has limited durability. It also can have storage problems.

U.S. Pat. Nos. 4,144,812 and 4,144,813 provide non-cylindrical printing sleeves and associated air-assisted printing rolls designed in a tapered or stepped-transition configuration, the change in the sleeve or printing cylinder diameter from one end to the other being progressive, i.e., increasing or decreasing according to the direction one is moving along the printing sleeve or roll. The printing roll comprises an outer surface having one end of a diameter greater than the other longitudinal end. The printing sleeve has an inner surface designed to form an interference fit with the outer surface of the printing roll only at the designated working position, and not along the entire axial uniform cross-sectional extent of the tapered sleeve. The '812 and '813 systems require a non-conventional, non-cylindrical plate cylinder, need higher than normal air pressures to operate, have only one thickness, dimension, and need cushioning between the cylinder and the plates.

Certain composite sleeves are available which deform if unsupported during vulcanization. Certain other sleeves, even if supported during the vulcanization process, become more brittle during vulcanization thereby reducing their durability. Finally, some sleeves are, due to the nature of the materials of construction, incapable of being vulcanized. Sleeve systems which exhibit problems such as storability, durability, inability to be vulcanized, a single thickness, the need of cushioning, or which have a total indicated run out which is not dependable, include the following: the Dupont Cyrel® Sleeve, the Miller Sleeve (Great Britain), the Saueressig Sleeve (Germany), the Rossini Sleeve (Spain), and the Roltec Sleeve (Germany).

SUMMARY OF THE INVENTION

The present invention overcomes the previously described problems by providing a printing sleeve which can be employed in flexographic printing and have properties as hereinafter described. The subject printing sleeve can be formed either as a single integral printing sleeve product or as a covering disposed around the outer periphery of an existing printing sleeve or plate cylinder. The subject printing sleeve produced thereby is durable, solvent resistant, seamless, low cost, has a high impression range, high print quality, and provides an excellent plate platform for flexographic printing operations.

In contradistinction to the prior art sleeves having thick rubber coverings, the subject printing sleeve can be formed without high temperature curing or vulcanization. The lower temperature process of the subject printing sleeves is safer and avoids damage or deformation to the underlying plate cylinder or print sleeve. This avoids impairing the accuracy of the flexographic printing process.

Additionally, the cost of manufacture will be approximately 50% of the cost of the printing sleeves of the present invention as compared to their thick rubber counterparts. Also, the weight of a subject printing sleeve is about 50–75% of a standard thick rubber printing sleeve. Finally, as opposed to standard thick rubber printing sleeves, the printing sleeve of the present invention can be used with all standard plate cylinders and repeat combinations.

As opposed to the prior art printing sleeves including thin foam plate cushions, the subject printing sleeves can be produced with a maximum total thickness variation, measured along the outer surface of the rubber covering, which is relatively small. The maximum total thickness variation is preferably at not more than about 0.0015", more preferably not more than about 0.0010", and most preferably not more than about 0.0005".

Other advantages associated with the printing sleeves of this invention are as follows:

a. They have excellent resistant to all common flexographic solvents and inks, including solvents such as ethanol, n-propanol, isopropanol, ethyl acetate and n-propyl acetate.

b. They are extremely durable and have very high tear-resistance, abrasion-resistance and tensile strength.

c. They are transparent to the plate mounter thereby requiring little or no labor to mount.

d. There are no thin foams to handle which are fragile, easy to abuse and damage, so that they have a unlimited useful life and can be readily mounted and remounted. Thin foams deliver relatively poor performance on heavy solid printed areas.

e. They are totally seamless in design.

The subject print sleeves have a much broader impression range than their prior art counterparts. As previously discussed, the term impression range describes an engagement distance which is the measured interference distance that the outer surface of the print indicia move with respect to the outer surface of the print substrate. In prior art systems, print quality and print performance, as measured by impression range, becomes visibly unacceptable when the engagement distance reaches about 0.008". This means that an unacceptable elongation of the print dots on the outer surface of the print substrate has become visibly manifest. However, when the printing sleeve of the subject invention is employed, the impression range preferably comprises an engagement distance of at least about 0,015", more preferably at least about 0.020", and most preferably at least about 0.025", without any substantial visible reduction in print performance.

For purposes of this invention, engagement distance is determined by the difference in the micrometer adjustment of the printing web press. The printing web press has a calibrated measurement indicator located thereon which indicates the engagement distance measurement.

Also, for purposes of this invention, the standard for acceptable print performance has been set. Acceptable print performance is a print dot distortion of not more than about 0.0005" in the machine direction and not more than about 0.0002" in the cross machine direction. These values are measured using a 60 Power microscope with a graduated reticle calibrated in operation of 0.0001.

The present invention is directed to a process for producing a durable, readily-storable, cylindrically-shaped printing sleeve. The subject sleeve has inner and outer cylindrically-shaped walls and a substantially constant cross-sectional inner and outer diameter. Preferably, the printing sleeves of this invention have a predetermined wall thickness which will produce the desired print pitch in combination with the plate make up used. Typical printing plate thicknesses are about 0,040" to 0,125". The printing sleeve is readily axially mountable on and dismountable from a complementary cylindrically-shaped printing cylinder having an outer cylindrically shaped wall.

A preferred process of this invention comprises providing a sleeve body. The diameter of the printing body is expandable by the introduction of air between the inner cylindrically-shaped wall of the printing sleeve and the outer cylindrically-shaped wall of the printing cylinder. The sleeve body being contractable by the removal of the low pressure fluid. A layer of a low temperature curable polymeric material is applied to the outer circumferential surface of the printing sleeve body. The low temperature curable polymeric material is then cured at a temperature to form a hardened layer of the polymeric material having a substantially uniform degree of hardness. An outer portion of the hardened layer of the polymeric material is then removed to produce a polymer-covered flexographic printing cylinder having the requisite thickness and finish. The desired finish can be achieved by, for example, grinding or machining.

In another preferred process, the entire sleeve body is formed of a low temperature curable polymeric material. Then, as before, the low temperature curable polymeric material is cured at a temperature not greater than about 150 degrees F. to form an entire sleeve body of a hardened polymeric material having a substantially uniform degree of hardness, particularly, the outer surface of the sleeve body. Preferably, the polymeric material is cured at a temperature not greater than about 150 degrees F., and preferably at a temperature not greater than about 100 degrees F., and most preferably at ambient temperature.

The preferred polymeric material is an elastomeric material and more preferably a polyurethane elastomeric material. Most preferably, the elastomeric material is a polyurethane material which cures at room temperature. The wall thickness of the outer surface of the sleeve body is preferably up to about 0.375", more preferably up to 0.250", and most preferably from about 0.125".

The durable, readily-storable, cylindrically-shaped printing sleeve of this invention for a sleeve of ¼" to ½" nominal thickness typically has a hardened outer layer of polymeric material which comprises a Shore "A" Hardness, depending on the thickness and compression characteristics. For wall thickness described above, the Shore A Hardness comprises a Durometer which is preferably from about 10 up to 45, more preferably from about 12 up to 35, and most preferably from about 15 up to 25. For purposes of this invention, Shore "A" Hardness was determined using ASTM-D2240.

Thickness, compression and recovery of the subject printing sleeve was determined using a Model CS-55 Tester manufactured by Custom Scientific Instruments, Inc. of Whippany, N.J. The presser foot and spindle weight equals ½ oz. and the weight rack and handwheel assembly weight equals 1½ oz. The minimum weight applied to a sample for compressions testing 2 oz. Preload is ½ oz. Compression performance (Total Compression and Compression Set) were measured by the following testing procedure:

1. Level the instrument. The handwheel in the frame behind the dial indicator will raise or lower the dial indicator. When the indicator is raised to its maximum height, a sample better than 1" thick may be measured. The knurled screw at the side is to lock the dial indicator in the desired position.

1.1 Clean the base of instrument and pressure foot.

1.2 Zero the instrument by allowing the presser foot to rest on base, and rotate the dial to line up the needle and the zero mark.

1.3 Using the hand wheel above the indicator, raise the weight rack until it is even with the guide pin top.

1.4 Raise the presser foot with the lift lever and insert the sample.

1.5 Lower the presser foot to rest upon the sample without impact. At this point the thickness may be noted. The time of reading the thickness under ½ oz preload may be read depending upon how the test is specified.

1.6 To measure the compressed thickness of the sample, it is necessary to lower the weight rack and the handwheel assembly by means of the handwheel to rest upon the spindle without impact. Depending upon the compressibility of the sample, the handwheel should be rotated a complete turn after contact has been made with the spindle. The compressed thickness may be noted on the dial at equilibrium or at a specified time period.

1.7 Compression Weights:

| Weights: | Load on Sample |
| --- | --- |
| No weight (spindle & wgt. rack) | 2 oz. |
| 2 oz. | 4 oz. |

-continued

| Weights: | Load on Sample |
| --- | --- |
| 4 oz. | 6 oz. |
| 8 oz. | 10 oz. |
| 16 oz. | 18 oz. |

1.8 To measure the recovered thickness, the handwheel is rotated to remove the weight, weight rack, and handwheel assembly from contact with the spindle. The recovered thickness may be noted on the dial at equilibrium at a specified time period:

1.9 Formula for calculations:

Total Compression =X−M

Recovery =X−R

Compression Set =X−Y

M=Thickness of sample under maximum load.

R=Thickness of sample after maximum load has been removed.

X=Original thickness of sample

Y=Recovered thickness of sample

The hardened layers of the printing sleeve can have a total compression measured under a unit load of from 2 to 14 ozs., of about 0.003 up to about 0.016, and a compression set, measured under a unit load of from 2 to 14 ozs., of from about 0.0001 up to about 0.0012.

The subject formation process can be accomplished by using a polymer which can be cured at no higher than moderate temperature conditions and corresponding pressure, such as a low cure temperature polyurethane elastomer, rather than conventional polymers which require higher cure temperatures and corresponding pressures, such as natural polymer and many synthetic polymers such as SBR, etc. The polymer is applied to a flexographic printing cylinder or sleeve and polymerized in situ at moderate temperature and pressure conditions, preferably at ambient temperature and pressure.

The above-described technology can be employed to enlarge a cylinder to a different repeat circumference. By using a polyurethane covering on a cylinder or sleeve of a smaller size the correct or required print pitch can be obtained without the cost of additional cylinders. It can also be employed to print a seamless pattern. By engraving the image on a polyurethane covering in the round, seams are avoided. Also, by using the subject covered cylinder or sleeves, the cushion under the plate can be eliminated.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a sectional view of the polymer-covered printing sleeve 10 of the present invention.

FIG. 2 is a sectional view of a fabrication form system for producing the printing sleeves 10 of the present invention.

FIG. 3 is a sectional view of the polymer-covered printing sleeve 10a of the present invention.

FIG. 4 is a sectional view of a fabrication form system for producing the printing sleeves 10a of the present invention.

DETAILED DESCRIPTION OF THE PREFERRED EMBODIMENT

Referring now to FIG. 1, cylindrically-shaped printing sleeve 10 is formed of an inner sleeve body 11 having a outer surface 12. An outer sleeve body 15 disposed about inner sleeve body 11, formed of a cured low temperature curable polymeric material, has an outer surface 16 and an inner surface 14.

Referring to FIG. 3, cylindrically-shaped printing sleeve 10a comprises a sleeve body 15a having an outer surface 16a and an inner surface 14a. Is also formed of a low temperature curable polymeric material. Outer sleeve surfaces 16 and 16a of either sleeve 10 or 10a is cured to certain minimum hardness and compressive strength values as defined below.

Sleeves 10 and 10a are depicted mounted on an illustrative conventional printing cylinder 22, such as described in FIG. 3 of U.S. Pat. No. 3,146,709. The printing sleeves 10 and 10a, and the printing cylinder 22 are cylindrical and have a constant diameter. The outer wall 23 of the cylinder 22 has a slightly larger diameter than the inner walls 14 and 14a so that the sleeve will firmly frictionally fit onto the cylinder. The cylinder 22 is hollow and has a cylindrical chamber 25 which is used as a compressed air chamber. The cylinder 22 comprises a cylindrical tube 26 fitted with airtight endplates 28 and 29. A plurality of spaced-apart, radially-extending apertures 30 are provided in the tube 26 through which air from the chamber 25 passes for expanding the sleeve 10 during mounting and dismounting operations. Air is introduced into the chamber 25 through air hose 32. Trunnions 31 are provided for rotationly supporting cylinder 22. A coupling element 33 is disposed within endplate 29 and provides a means for connecting air hose 32 to cylinder 22 for introducing compressed air to the cylinder chamber 25.

The cylindrically-shaped inner sleeve 11 in FIG. 1 and 2 typically comprises a reinforced, non-permeable laminate structure. An example of a typical formation process for producing such a reinforced non-permeable laminate printing sleeve is as follows: A typical internal steel mandrel of about 5.5 feet in length and about 1.5–15 inches in diameter is employed as the structural form in the fabrication of the reinforced non-permeable laminate printing sleeve 11. The mandrel is a cylindrically-shaped printing cylinder having a hollow internal chamber and a substantially cylindrically-shaped outer wall surface including an array of holes located in the cylinder wall. The pressurized air employed to expand a printing sleeve passes from the internal chamber outwardly through the array of air holes. In the printing sleeve formation process these air holes are first taped shut in order to prevent the synthetic resin employed in forming the printing sleeve from passing through the air holes into the central chamber of the mandrel. The diameter of the outer wall section of the printing cylinder is sized to produce a printing sleeve having an inner wall surface of substantially constant diameter, the magnitude of such inner wall being slightly smaller than the diameter of the outer wall section of the printing cylinder on which it will ultimately be mounted to promote an interference fit of the sleeve about the ultimate printing cylinder.

The outer wall surface 16 of sleeve 10 and the entire sleeve 10a are formed of a polymeric material which is cured at moderate process conditions to form a hardened structure having the requisite properties for use as a flexographic printing surface as hereinafter defined. The moderate process conditions of temperature and corresponding pressures have been previously defined.

The preferred polymeric material for use as the polymer covering 15 or sleeve body 15a of this invention is a polyurethane, and more particularly a polyurethane which will cure at a temperature which will form a hardened layer of the polymeric material having a substantially uniform degree of hardness without damaging or distorting the printing sleeve. The polyurethane materials are based on two reactant systems. The first material is an isocyanate and the second is a polyol.

In general, as previously described, the subject polymeric materials will cure at temperature up to about 150 degrees. However, the preferred materials are room temperature cure materials, and more preferably room temperature cure polyurethane materials. Of these latter materials, polyurethanes which cure at room temperature are most preferred. Examples of the urethane materials which can be used as polymer-covering 20 are URALITE™ manufactured by Hexcel Corporation, INSTATHANE™ manufactured by Textile Polymer & Chemical Company, Formulation 1218 manufactured by Evergreen Plastics, and CEL™ manufactured by Willamette Valley Corporation which meet the specifications of Shore "A" Hardness, Total Compression and Compression Set as previously described herein, and which result in the requisite print performance of a printing sleeve having a given thickness.

Therefore, the printing sleeve can be applied to any type of underlying cylinder, although it can be particularly designed for use on flexographic printing cylinders. As shown in FIGS. 2, this can be accomplished by placing a mold or form around the outside of inner sleeve 11 to be covered and capping off one end of the assembly by end caps 18 and 20. As shown in FIG. 4, the mold includes a form comprising end caps 18a and 20a having a cylinderal mandrel 19a connected thereto which extends throughout the entire inner cavity so that a sleeve 10a can be form in a single piece from the curable polymeric material. The polymer forming components are then introduced into the cavity formed between the cylinder and the mold or form. In the case of a room temperature curable material, such as a room temperature curable thermosetting polymeric material, will be introduced into the formation cavity, and the curing will take place over a predetermined period of time. For example, in the case of a room temperature curable polyurethane material such as described above, curing at room temperature will take place in about 24 hours.

Typically, sleeves 10 and 10a will serve as a support for the application of printing plates 24, preferably flexographic printing plates, which are generally made of a flexible polymeric material. Any suitable indicia for printing onto a printing medium may be set on these printing plates. Alternatively, outer wall 15 may itself be employed as the means for printing onto a printing medium. Various methods can be employed to engrave the outer surfaces 16 and 16a. For example, one could employ chemical or photochemical engraving techniques to form the requisite means for printing the print indicia.

In use, the material employed for forming the polymer-covering is applied to a flexographic printing cylinder, such as a cylindrically-shaped flexographic printing cylinder manufactured of a metallic material such as steel or the like. In a typical procedure for producing the subject polymer-covering flexographic printing cylinder a diisocyanate and a polyol are separately introduced into the internal chamber formed within a Edge Sweets variable mix head. For example, a Willamette Valley CEL 35 polyol resin having a Shore A hardness of about 44 can be produced for covering the exterior surface of a printing roll. The polyol resin at a temperature of 75 to 85 degrees F. is fed into the mixing head at about 6000 rpm using a 100 cc pump and the diisocyanate is introduced into the mixing head at a temperature of 75 to 80 degrees F. using a 50 cc pump. The weight ratio of polyol resin to diisocyanate is about 3.7:1.

A composite printing sleeve from International Composites Corporation of Vancouver, Wash., the outer surface of which has been cleaned, is surrounded by an outer cylindrical mold sized to form a cavity therebetween of a desired thickness. The mold is leveled and the polyurethane material described above is introduced into the cavity surrounding the sleeve. The polyurethane is cured in situ at ambient conditions for about an hour, and the entire sleeve-mold-polyurethane assembly is put into an oven for completing the curing process, in this case 24 hours at 150 degree F. Once curing is completed, the outer mold is removed and the covered sleeve is cooled to room temperature. A portion of the outer surface of the hardened layer of the polymeric material is then removed to produce a predetermined thickness and finish therein using a lathe or other like grinding equipment.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A process for producing a durable, readily-storable, cylindrically-shaped flexographic printing sleeve having inner and outer cylindrically-shaped walls and a substantially constant cross-sectional inner and outer diameter, the flexographic printing sleeve being readily axially mountable on and dismountable from a complementary cylindrically-shaped printing cylinder having an outer cylindrically shaped wall, which comprises providing a printing sleeve body, the diameter of the printing sleeve body being expandable by the introduction of low pressure fluid between an inner surface of the printing sleeve body and the outer cylindrically-shaped wall of the printing cylinder, the printing sleeve body being contractible by the removal of low pressure fluid;

applying a layer of a low temperature curable polymeric material to an outer surface of the printing sleeve body;

curing the layer of the low temperature curable polymeric material at a temperature not greater than about 150 degrees F. to form a hardened layer of polymeric material having a substantially uniform degree of hardness without damaging or distorting the printing sleeve; and removing a portion of the hardened layer of the polymeric material to produce said flexographic printing sleeve, said flexographic printing sleeve having a thickness of up to about 0.375" and an impression range comprising an engagement distance of at least about 0.015", without any substantial visible reduction in print performance, said print performance comprising a print dot distortion of not more than about 0.0005" in the machine direction and not more than about 0.0002" in the cross machine direction.

2. The process of claim 1, wherein the polymeric material is cured without adding heat during the curing process.

3. The process of claim 1, wherein the wall thickness of the hardened layer of the flexographic printing sleeve is up to about 0.250".

4. The process of claim 3, wherein the polymeric material is a polyurethane which cures at room temperature.

5. The process of claim 1, wherein the polymeric material is polyurethane material.

6. The process of claim 1, wherein the printing sleeve is resistant to ethanol, n-propanol, isopropanol, ethyl acetate and n-propyl acetate.

7. The process of claim 1, wherein the hardened layer of the polymeric material has a Shore "A" Hardness of from about 10 up to about 45.

8. The process of claim 1, wherein the hardened layer of the polymeric material has a Total Compression, measured under a unit load of from 2 to 14 ozs., of from about 0.003 up to about 0.016.

9. The process of claim 1, wherein the hardened layer of the polymeric material has a Compression Set, measured under a unit load of from 2 to 14 ozs., of from about 0.0001 up to about 0.0012.

10. The process of claim 1, wherein the hardened layer of the polymeric material has a total thickness variation along the length of the printing sleeve of not more than 0.0010".

11. A process for producing a durable, readily-storable, cylindrically-shaped flexographic printing sleeve having an inner and outer cylindrically-shaped wall and a substantially constant cross-sectional inner and outer diameter, the flexographic printing sleeve being readily axially mountable on and dismountable from a complementary cylindrically-shaped printing cylinder having an outer cylindrically shaped wall, which comprises providing a printing sleeve body having an outer circumferential surface;

placing a mold around the outer circumferential surface of the printing sleeve body, the mold and the outer circumferential surface of the printing sleeve body defining a cavity formed therebetween;

introducing into the cavity and about the outer circumferential surface of the printing sleeve body a low temperature curable polymeric material;

curing the low temperature curable polymeric material at a temperature not greater than about 150 degrees F. to form a hardened layer of the polymeric material joined to the outer circumferential surface of the printing sleeve body without damaging or distorting the printing sleeve; and removing a portion of the hardened layer of the polymeric material to produce said flexographic printing sleeve of predetermined thickness of up to about 0.375" and an impression range comprising an engagement distance of at least about 0.015", without any substantial visible reduction in print performance, said print performance comprising a print dot distortion of not more than about 0.0005" in the machine direction and not more than about 0.0002" in the cross machine direction.

12. The process of claim 11, wherein the polymeric material is cured without adding heat during the curing process.

13. The process of claim 11, wherein the wall thickness of the hardened layer of the flexographic printing sleeve is up to about 0.250".

14. The process of claim 13, wherein the polymeric material is a polyurethane which cures at room temperature.

15. The process of claim 11, wherein the polymeric material is polyurethane material.

16. The process of claim 11, wherein the printing sleeve is resistant to ethanol, n-propanol, isopropanol, ethyl acetate and n-propyl acetate.

17. The process of claim 11, wherein the hardened layer of the polymeric material has a Shore "A" Hardness of from about 10 up to about 45.

18. The process of claim 11, wherein the hardened layer of the polymeric material has a Total Compression, measured under a unit load of from 2 to 14 ozs., of from about 0.003 up to about 0.016.

19. The process of claim 11, wherein the hardened layer of the polymeric material has a Compression Set, measured under a unit load of from 2 to 14 ozs., of from about 0.0001 up to about 0.0012.

20. The process of claim 11, wherein the hardened layer of the polymeric material has a total thickness variation along the length of the printing sleeve of not more than 0.0010".

21. A durable, readily-storable, cylindrically-shaped flexographic printing sleeve having inner and outer cylindrically-shaped wall and a substantially constant cross-sectional inner and outer diameter, the flexographic printing sleeve being readily axially mountable on and dismountable from a complementary cylindrically-shaped printing cylinder having an outer cylindrically shaped wall, the flexographic printing sleeve being produced by a process comprising providing a printing sleeve body, the diameter of the printing sleeve body being expandable by the introduction of low pressure fluid between an inner surface of the printing sleeve body and the outer cylindrically-shaped wall of the printing cylinder, the printing sleeve body being contractible by the removal of low pressure fluid;

applying a layer of a low temperature curable polymeric material to an outer surface of the printing sleeve body;

curing the layer of the low temperature curable polymeric material at a temperature not greater than about 150 degrees F. to form a hardened layer of polymeric material having a substantially uniform degree of hardness without damaging or distorting the printing sleeve; and removing a portion of the hardened layer of the polymeric material to produce said flexographic printing sleeve having a thickness of up to about 0.375" and an impression range comprising an engagement distance of at least about 0.015" without any substantial visible reduction in print performance, said print performance comprising a print dot distortion of not more than about 0.0005" in the machine direction and not more than about 0.0002" in the cross machine direction.

22. A process for printing a printable material onto a substrate in a predetermined pattern, which comprises providing a cylindrically-shaped printing cylinder having an outer cylindrically shaped wall;

providing a printing sleeve body having an inner and an outer substantially cylindrically-shaped wall and a substantially constant cross-sectional inner diameter, the printing sleeve body being expandable by the introduction of pressurized air between the inner wall of the printing sleeve body and the outer wall of the printing cylinder, the printing sleeve body being contractible by the removal of the pressurized air;

applying a layer of a low temperature curable polymeric material to the outer substantially cylindrically-shaped wall of the printing sleeve body;

curing the low temperature curable polymeric material at a temperature not greater than about 150 degrees F. to form a hardened layer of the polymeric material;

removing a portion of the hardened layer of the polymeric material to produce a flexographic printing sleeve having a thickness of up to about 0.375";

providing printing indicia in a predetermined pattern on the hardened layer of the printing sleeve;

axially mounting the printing sleeve onto the complementary cylindrically-shaped printing cylinder;

applying a printing material to the printing indicia; and printing the predetermined pattern of the printing material from the printing indicia onto the substrate, the printing sleeve having an impression range comprising an engagement distance of at least about 0.015", without any substantial visible reduction in print performance, said print performance comprising a print dot distortion of not more than about 0.0005" in the machine direction and not more than about 0.0002" in the cross machine direction.

23. The process of claim 22, wherein the polymeric material is cured without adding heat during the curing process.

24. The process of claim 22, wherein the wall thickness of the hardened layer of the printing sleeve is up to about 0.250".

25. The process of claim 22, wherein the polymeric material is polyurethane material.

26. The process of claim 22, wherein the printing sleeve is resistant to ethanol, n-propanol, isopropanol, ethyl acetate and n-propyl acetate.

27. The process of claim 22, wherein the polymeric material is a polyurethane which cures at room temperature.

28. The process of claim 22, wherein the hardened layer of the polymeric material has a Shore "A" Hardness of from about 10 up to about 45.

29. The process of claim 22, wherein the hardened layer of the polymeric material has a Total Compression, measured under a unit load of from 2 to 14 ozs., of from about 0.003 up to about 0.016.

30. The process of claim 22, wherein the hardened layer of the polymeric material has a Compression Set, measured under a unit load of from 2 to 14 ozs., of from about 0.0001 up to about 0.0012.

31. The process of claim 22, wherein the hardened layer of the polymeric material has a total thickness variation along the length of the printing sleeve of not more than 0.0010".

* * * * *